US006704437B1

(12) United States Patent
He et al.

(10) Patent No.: US 6,704,437 B1
(45) Date of Patent: Mar. 9, 2004

(54) NOISE ESTIMATION METHOD AND APPARATUS FOR NOISE ADAPTIVE ULTRASONIC IMAGE PROCESSING

(75) Inventors: Anming He, San Jose, CA (US); Kutay Ustuner, Mountain View, CA (US)

(73) Assignee: Acuson Corporation, Mountain View, CA (US)

(*) Notice: Subject to any disclaimer, the term of this patent is extended or adjusted under 35 U.S.C. 154(b) by 0 days.

(21) Appl. No.: 09/431,304

(22) Filed: Oct. 29, 1999

(51) Int. Cl.[7] .................................................. G06K 9/00
(52) U.S. Cl. ........................ 382/128; 382/261; 600/437
(58) Field of Search ................................ 382/100, 108, 382/128–134, 261; 345/611–618; 378/62–64, 98.12; 600/453, 437, 441, 443, 447; 250/370.08

(56) References Cited

U.S. PATENT DOCUMENTS

| | | | | |
|---|---|---|---|---|
| 3,611,369 A | * | 10/1971 | Maguire | 342/91 |
| 4,648,276 A | * | 3/1987 | Klepper et al. | 73/599 |
| 4,817,015 A | * | 3/1989 | Insana et al. | 600/437 |
| 4,833,625 A | * | 5/1989 | Fisher et al. | 345/536 |
| 4,835,712 A | * | 5/1989 | Drebin et al. | 345/423 |
| 4,945,478 A | * | 7/1990 | Merickel et al. | 382/131 |
| 4,991,093 A | * | 2/1991 | Roberge et al. | 382/131 |
| 5,050,226 A | * | 9/1991 | Collet-Billon | 382/128 |
| 5,099,848 A | * | 3/1992 | Parker et al. | 600/443 |
| 5,388,583 A | * | 2/1995 | Ragauskas et al. | 600/451 |
| 5,462,058 A | * | 10/1995 | Yamada et al. | 600/454 |
| 5,522,393 A | * | 6/1996 | Phillips et al. | 600/455 |
| 5,622,174 A | * | 4/1997 | Yamazaki | 600/441 |
| 5,632,272 A | * | 5/1997 | Diab et al. | 600/323 |
| 5,933,540 A | * | 8/1999 | Lakshminarayanan et al. | 382/128 |
| 6,120,446 A | * | 9/2000 | Ji et al. | 600/437 |

OTHER PUBLICATIONS

Evans et al., "Biased Motion–Adaptive Temporal Flltering for Speckle Reduction in Echocardiography", IEEE Transactions on Medical Imaging, vol. 15, No. 1, Feb. 1996, pp. 39–50.*

* cited by examiner

*Primary Examiner*—Jayanti K. Patel

(57) ABSTRACT

A noise-adaptive method for processing an ultrasonic image set forms a filtered image set having a selectively enhanced noise component as compared to the original image set. A noise parameter is generated as a function of the image set and the filtered image set, and then the noise parameter is used in ultrasonic image processing. A background noise image is generated from the noise parameter and the original image and is used in ultrasonic image processing.

13 Claims, 4 Drawing Sheets

NOISE ESTIMATION METHOD AND APPARATUS FOR NOISE ADAPTIVE ULTRASONIC IMAGE PROCESSING

BACKGROUND

The present invention relates to medical diagnostic ultrasonic imaging, and in particular to noise-adaptive image processing techniques for use with ultrasonic images.

Denison U.S. Pat. No. 4,761,819 discloses an adaptive noise reduction filter for use with MRI or other scanners. In the disclosed system a weighting function is used based on the variance of the diagnostic data noise and the variance of the pixel value. Noise variance is estimated by the smallest data value difference between each data value and its neighbors.

The present invention is directed to a noise-adaptive method and apparatus for processing a medical diagnostic ultrasonic image which employs a new method and apparatus for assessing local noise level of the image.

SUMMARY

The preferred embodiment described below applies a highpass filter to an ultrasonic image set to form a filtered image set. This filtered image set has a selectively enhanced noise component (and a selectively reduced signal component) as compared with the original image set. A pixelwise noise parameter is generated as a function of the image set and the filtered image set, and this noise parameter is then used in ultrasonic image processing.

The foregoing discussion has been provided merely by way of introduction, and is not intended to limit the scope of the following claims.

DETAILED DESCRIPTION OF THE PRESENTLY PREFERRED EMBODIMENTS

The preferred embodiments described below estimate electronic noise level at each image pixel, and then employ the estimated electronic noise level for electronic noise reduction and electronic noise level adaptive image processing. These embodiments estimate electronic noise level from the image itself and then use this estimated electronic noise level to reduce noise in the processed image while retaining the desired acoustic signal.

The present inventors have recognized that one important difference between electronic noise and the desired acoustic signal is that the correlation lengths among neighboring data points are greater for the desired acoustic signal than for electronic noise. The technique described below is based on the premise that electronic noise is less correlated than the desired acoustic signal in at least one of the following dimensions: azimuth, range, elevation, and time. This premise is valid if the object being imaged is not moving too fast and the sampling rates in time and space are adequate. The electronic noise level can be estimated by comparing the variance of the neighborhood of each pixel for the original image and for a highpass-filtered version of the original image. The ratio between the variances can then be used to generate a noise parameter ranging from 0 to 1, where 0 is indicative to a 0 noise level and 1 is indicative to a 100% noise level. This noise parameter is then used in image processing, as for example by removing the noise from the original image.

Figure 1:
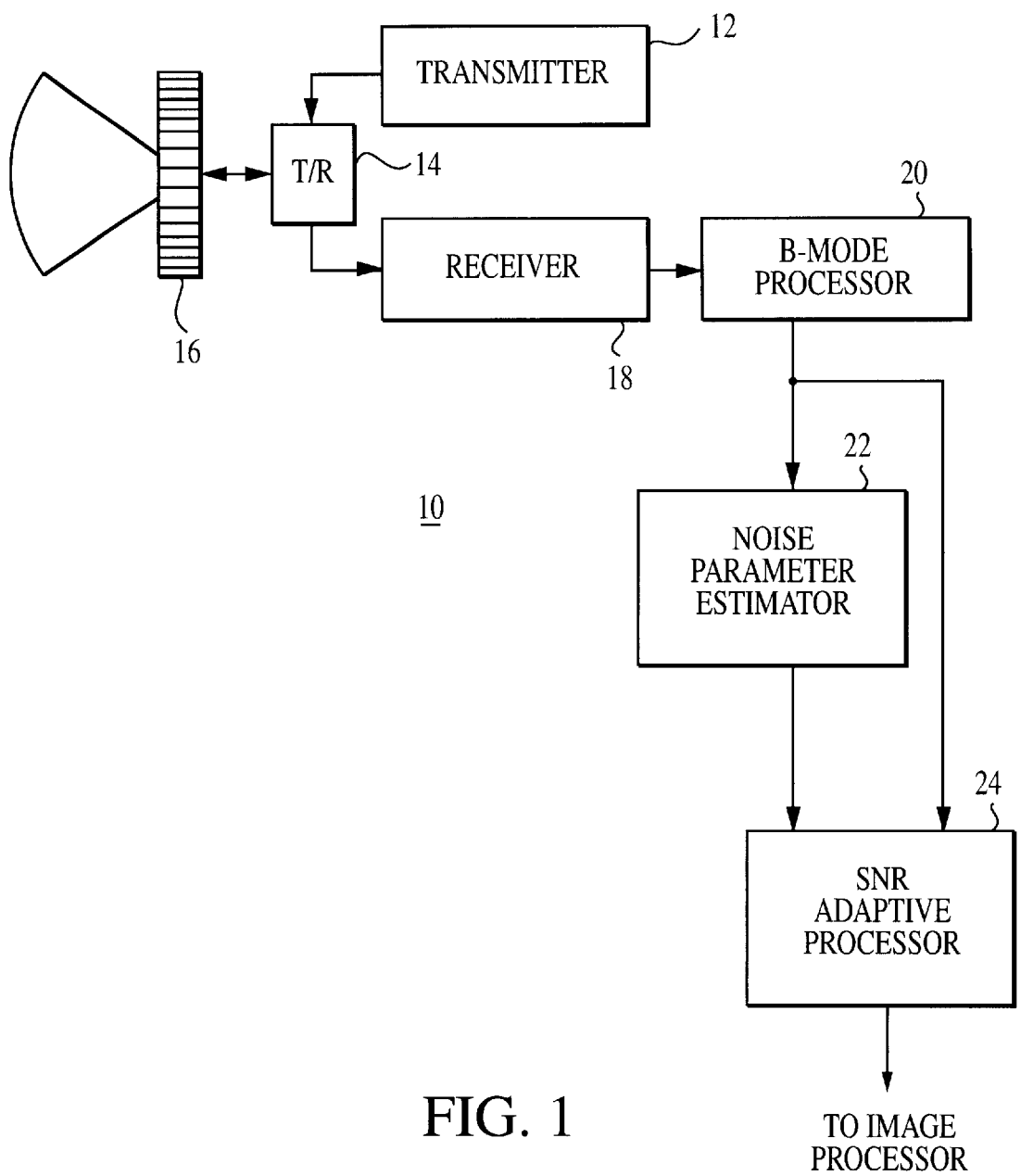
FIG. 1 is a block diagram of an ultrasonic imaging system that incorporates a preferred embodiment of this invention.

FIG. 1 shows a block diagram of a medical diagnostic ultrasonic imaging system 10 that incorporates a preferred embodiment of this invention. The imaging system 10 includes a transmitter 12 such as a transmit beamformer that applies ultrasonic transmit waveforms via a multiplexer 14 to a phased array ultrasonic transducer 16. The transducer 16 forms ultrasonic waves that are transmitted into a region being imaged in a conventional manner.

Returning ultrasonic echoes from the region being imaged are converted into receive signals by the transducer 16. These receive signals are conducted via the multiplexer 14 to a receiver 18 that typically includes a receive beamformer. Beamformed signals from the receiver 18 are applied as an input to a B-mode processor 20 that generates B-mode detected images at its output. These images are applied to a noise parameter estimator 22 and to an SNR (signal to noise ratio) adaptive processor 24. As explained in greater detail below, the noise parameter estimator 22 estimates a noise parameter indicative of the level of local noise based on the statistics of an image at multiple regions of the image. The SNR adaptive processor 24 uses the noise parameter from the noise parameter estimator 22 to enhance the image, which is then applied to an image processor (not shown). In an alternative embodiment, the noise parameter estimator 22 can be placed after the receive beamformer of the receiver 18 and before the detector of the B-mode processor 20.

All of the elements 12 through 20 of the system 10 can be implemented in any suitable form, using either analog or digital technology. These elements of the system 10 have been provided by way of example in order to provide a framework to allow the preferred embodiments of this invention to be described clearly. It is not intended to limit this invention to any specific form of the elements 12 through 20, and many variations are possible. For example, the transmitter 12 and the receiver 18 may be coupled to separate ultrasonic transducers, eliminating the need for a multiplexer 14. A wide variety of transmitters and receivers can be used. The transducer 16 can be 1, 1.5 or 2 dimensional, and mechanical ultrasonic focusing techniques can be used in combination with or in substitution for conventional phased array focusing techniques.

Figure 2:
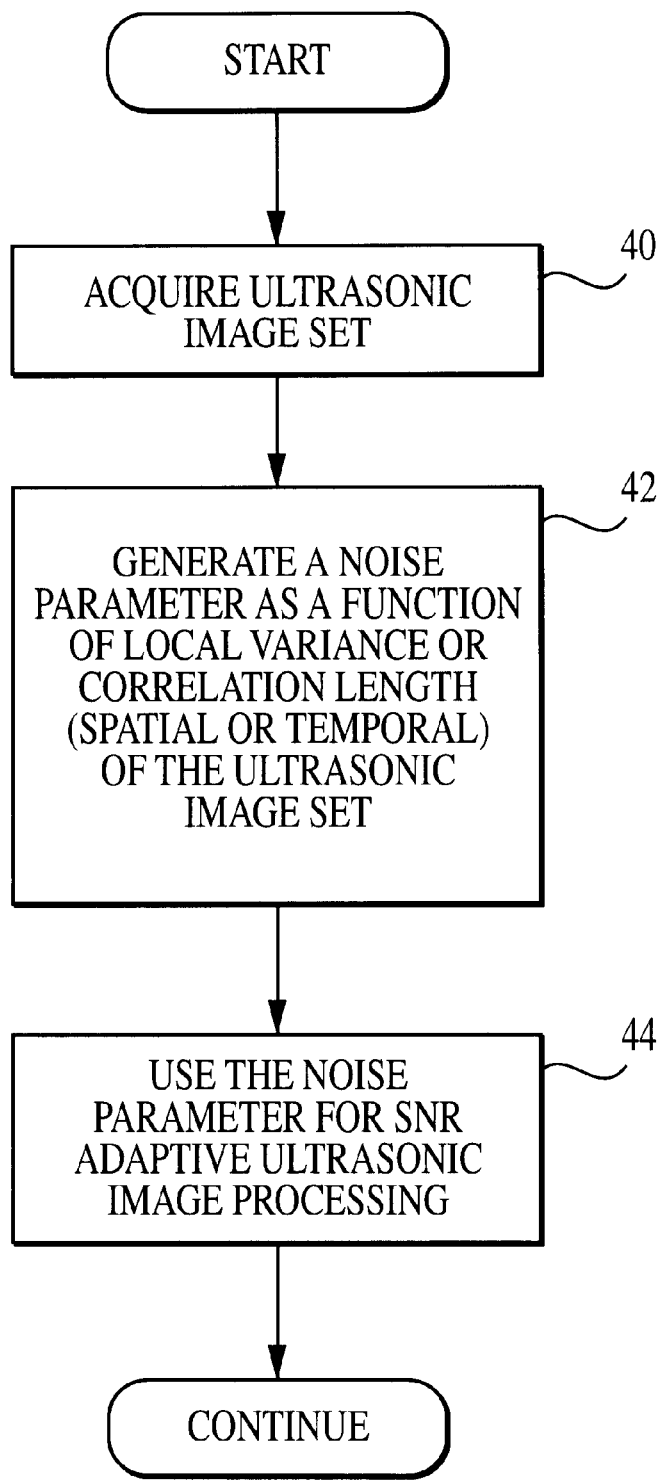
FIG. 2 is a block diagram of a method performed by the system of FIG. 1.

FIG. 2 provides a high level flow chart of a method practiced by the system 10 of FIG. 1. At 40 a set of one or more images is acquired. For example, the images can be acquired using the elements 12 through 20 of FIG. 1. Alternately, ultrasonic images can be acquired from a storage system. The term "acquiring" is intended broadly to encompass any method for measuring or retrieving ultrasonic images, whether in analog or digital form. The term "image" is intended broadly to encompass a part of an image such as a single scan line or a series of scan lines. The acquired ultrasonic images are not restricted to any specific imaging mode, and can take the form for example of B-mode, color Doppler energy, color Doppler velocity, or color Doppler variance, whether in fundamental or harmonic imaging mode, including both contrast harmonic and tissue harmonic imaging. The ultrasonic image set acquired at 40 may be at any suitable stage in image processing, and is not limited to post-detection, log-compressed images. At 42 a noise parameter is generated as a function of local variance or correlation length (spatial or temporal) of the ultrasonic image set. The term "variance" is intended broadly to encompass any statistical measure of disorder along the selected axis or axes (dimension(s)). This noise parameter is preferably generated at multiple points within the image. For example, a separate noise parameter can be generated for each pixel of the image, as described below. At 44 the noise parameter developed at 42 is used for SNR adaptive ultrasonic image processing.

Figure 3:
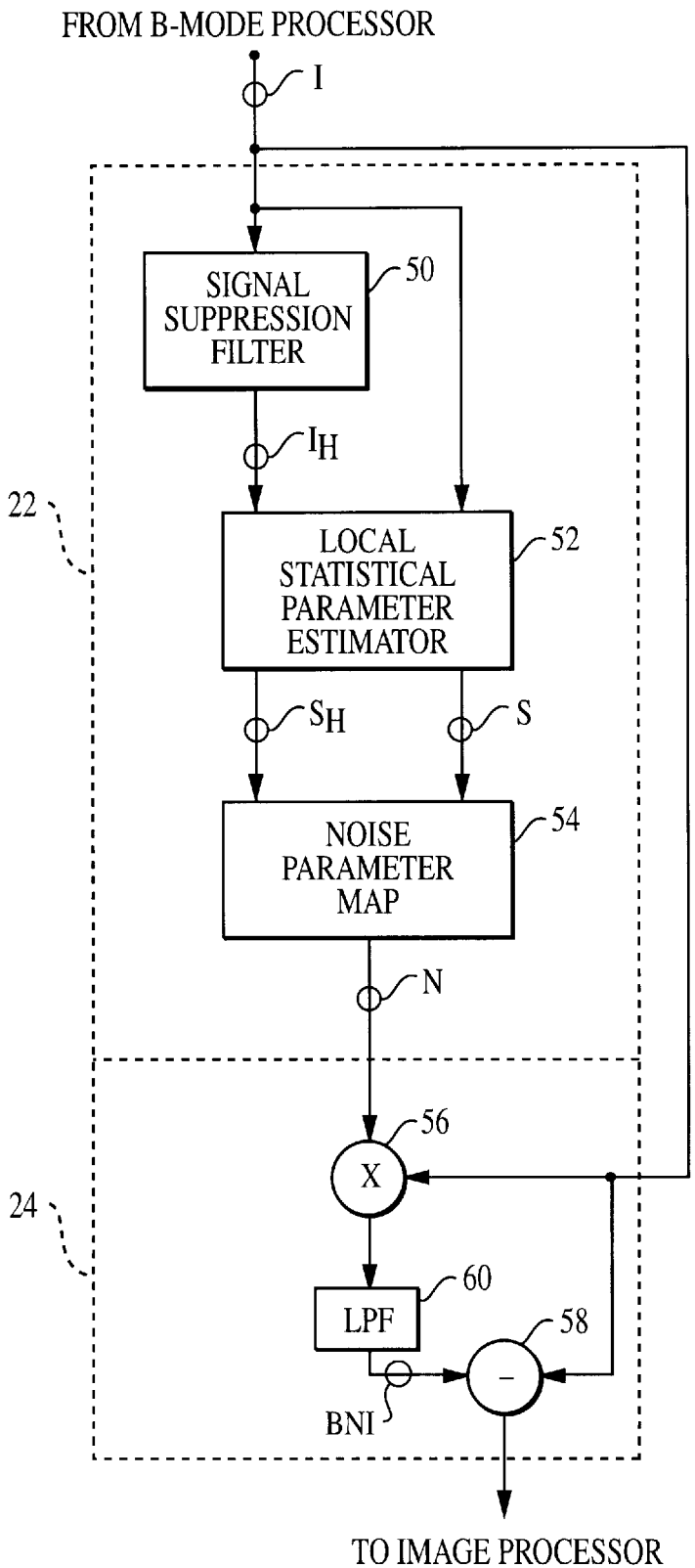
FIG. 3 is a more detailed block diagram of the noise estimator and the SNR adaptive processor of FIG. 1.

FIG. 3 shows a more detailed block diagram of one embodiment of the noise parameter estimator 22 and the SNR adaptive processor 24 of FIG. 1. As shown in FIG. 3, the B-mode processor provides an image l(r,x,n), where r indicates range, x indicates scan line number, and n indicates frame number. The image l(r,x,n) can correspond to an image at any stage in signal processing after analog to digital conversion of the received signal. The image l(r,x,n) is applied in parallel to a signal suppression filter 50 and to a local statistical parameter estimator 52. The image l(r,x,n) in this example includes both the desired signal and the electronic noise generated by the system, and the image l(r,x,n) can be a full-frame image or a partial-frame image.

The signal suppression filter 50 is preferably a highpass filter or a band stop filter, depending upon where the image is in the receive signal processing path and the dimension or axis selected for the filter 50. The filter 50 can be a filter with one or more dimensions selected from the axial, azimuthal, elevational, and time dimensions. When the filter 50 is positioned to operate on baseband signals, the filter 50 can be referred to as having a low frequency stopband, because it preferentially filters out low frequency components of the image, thereby enhancing noise components of the image. The output of the filter 50 is designated as $I_H(r,x,n)$. Electronic noise has a white spatial and temporal spectrum, which extends to half the sampling frequency in each dimension. In contrast, acoustic signals have more limited bandwidths. Pre and post-detection processing, which may include filtering and interpolation, may limit the spectral bandwidth of electronic noise in certain dimensions. For this reason, it is preferred to use a signal suppression filter 50 that operates on a dimension having little or minimum noise bandwidth limitation. When the image l(r,x,n) is least filtered along the x dimension, a suitable filter for the filter 50 is $[-1\ 2\ -1]/\sqrt{6}$ in the x dimension.

The local statistical parameter estimator 52 estimates the noise content of the image I to generate the parameter S and the noise content of the filtered image $I_H$ to generate the parameter $S_H$. The statistical parameter estimator 52 calculates statistical parameters such as mean and variance in the neighborhood of each image pixel for both the image I and the filtered image $I_H$. Typically, the neighborhood size used to calculate the mean and variance includes several resolution cells. For example, the statistical parameter estimator 52 can calculate the variances of $I_H$ and I for each image pixel and then apply a low-pass filter to the variances to generate $S_H$ and S, respectively.

Figure 5:
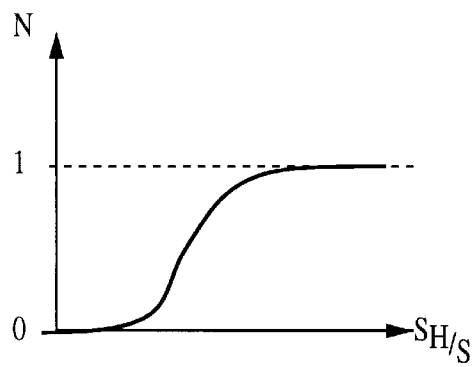
FIG. 5 is a graph of a map function.

The noise estimates $S_H$, S are applied as inputs to a noise parameter map 54. The output of the map 54 is a noise parameter N(r,x,f) that takes values within the range of [0,1]. The noise parameter map 54 maps the ratio $S_H/S$ to the noise parameter N. Preferably, the noise parameter map 54 includes multiple maps that are selected in accordance with beamformer parameters such as point spread function and sampling rate. One suitable function that can be used in the map 54 is shown in FIG. 5.

The noise parameter N generated by the map 54 can be used to reduce the electronic noise level of the original image, or it can be used as an input for other noise-adaptive image processing. In one example the noise parameter N is multiplied by the image I at 56, and the result is smoothed by a low-pass filter 60 and subtracted from the image I at 58 to provide a noise-reduced image.

Once generated from one image, the noise parameter N can be used to process additional images, because the background noise remains relatively unchanged until operating conditions for the imaging system are changed. For this reason, it may be preferred to calculate the noise parameter N only once for each set of operating conditions. The background noise image BNI generated by the multiplier 56 or filter 60 of FIG. 3 can be taken as an example of a background noise image. The image BNI depends on the signal level of the current image, and is therefore different from image to image.

It should be understood that the noise parameter developed above can be used in a wide variety of ultrasonic imaging processing, and the example of FIG. 3 is not intended to be limiting. For example, the noise parameter can be used to select a response function that can include a compounding function, a synthesis function, a compression function, a gain function, a spatial filtering function, or a temporal filtering function. U.S. patent application Ser. No. 09/430,156, filed on the same day as the present appation and assigned to the assignee of the present invention, provides a fuller description of a variety of noise-adaptive image processing methods that can be used. The entirety of this copending application is hereby incorporated by reference.

Figure 4:
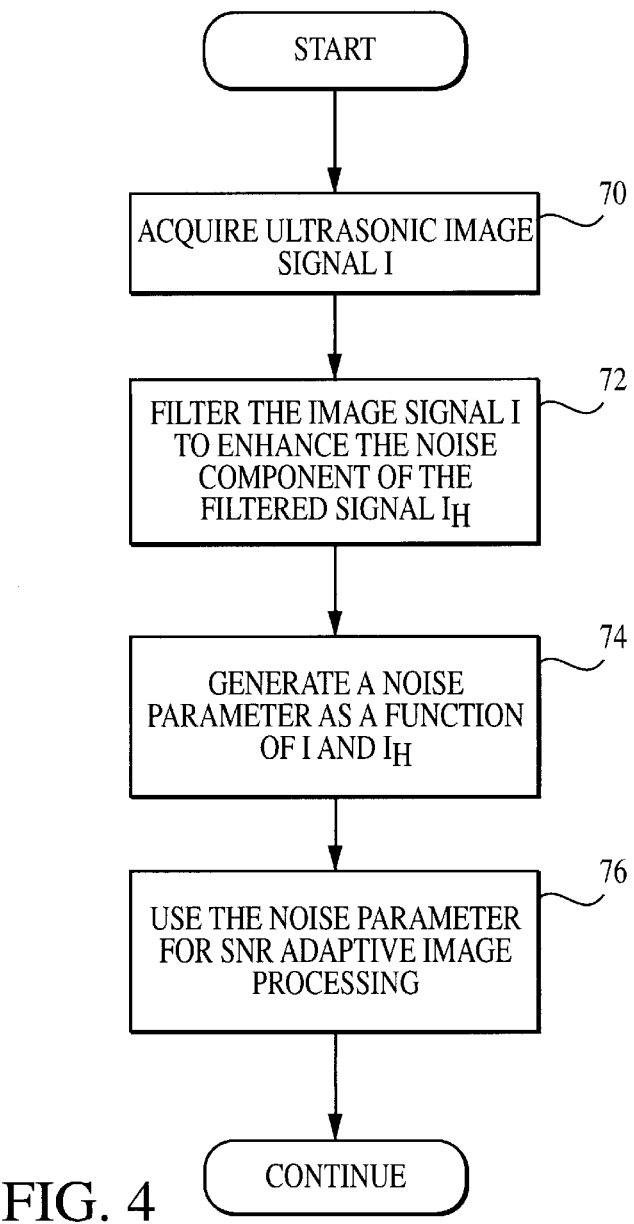
FIG. 4 is a flow chart of a method performed by the system of FIG. 3.

FIG. 4 shows a block diagram of a method implemented with the elements of FIG. 3. At 70 an ultrasonic image I is acquired. At 72 the image I is filtered to enhance the noise component and to reduce the signal component of the filtered image $I_H$. At 74 a noise parameter is generated as a function of I and $I_H$, and at 76 the noise parameter is used for SNR adaptive image processing. The noise parameter can be used in any of the ways described above. For example, the noise parameter can be used to generate a measure of electronic noise or SNR.

The method and apparatus described above provide the advantage that noise is estimated simply and reliably using only the image itself. No separate noise measurements are required as in certain prior art approaches.

Of course, it should be understood that many changes and modifications can be made to the preferred embodiments described above. For example, any suitable filters can be used, whether implemented with analog or digital techniques. The noise measurements described above can be made at many points on the receive signal processing path, and these measurements can be made using a wide variety of system hardware.

As used herein the term "noise parameter" is intended broadly and is not to be limited to the foregoing examples. For example, a noise parameter may be indicative of noise or signal to noise ratio of a portion of an image.

The term "function of" is intended broadly to encompass both direct and indirect functions. Thus, a parameter is said to be a function of a first variable whether or not it is also a function of a second variable. Functions can be linear, nonlinear, reciprocal or the like, and can be implemented in any desired computational, lookup table, or selection approach.

The term "generate" is intended broadly to encompass a wide variety of techniques, including lookup table techniques, selection techniques, and calculation techniques, whether analog or digital.

The term "correlation length" is intended broadly to encompass any statistical measure of the degree of correlation among image signals within a neighborhood along any desired dimension or axis.

The term "set" is intended broadly to encompass one or more.

The term "image" is intended broadly to encompass one dimensional, two dimensional or greater dimensional images including one or more than one frame of image data.

The term "circuit" is intended to encompass both analog and digital circuits, including programmed computers. First and second circuits may be implemented by the same hardware at different times when a computer is executing different program sequences.

The foregoing detailed description has described only a few of the many forms that this invention can take. For this reason, it is only the following claims, including all equivalents, that are intended to define the scope of this invention.

What is claimed is:

1. A noise-adaptive method for processing a medical diagnostic ultrasonic image, said method comprising:
   (a) acquiring a medical diagnostic ultrasonic image set;
   (b) forming a filtered image set from the image set, said filtered image set having a selectively enhanced noise component as compared with the image set;
   (c) generating a noise parameter as a function of both of: the image set acquired in (a) and the filtered image set having the selectively enhanced noise component formed in (b);
   (d) using the noise parameter in ultrasonic image processing selected from the group of: noise adaptive image processing in addition to (b) and selecting a response function as a function of the noise parameter.

2. The method of claim 1 wherein (b) comprises filtering the image set with a filter comprising a low-frequency stopband.

3. The method of claim 1 wherein (c) comprises generating the noise parameter as a function of at least one statistical parameter of the image set and the filtered image set.

4. The method of claim 3 wherein the at least one statistical parameter comprises variance.

5. The method of claim 1 wherein the filtered image set is filtered along at least one axis selected from the group consisting of: azimuth, range, elevation, time, and combinations thereof.

6. The method of claim 1 wherein the image set of (a) comprises at least one image selected from the group consisting of: a pre-detection image, a post-detection image, and a post-compression image.

7. A noise-adaptive medical diagnostic ultrasonic image processing system comprising:
   a filter responsive to a medical diagnostic ultrasonic image set and operative to form a filtered image set having a selectively enhanced noise component as compared to the image set;
   a first circuit responsive to both of the image set input to the filter and the filtered image set formed by the filter to have a selectively enhanced noise component and operative to generate a noise parameter in response thereto; and
   a second circuit operative to use the noise parameter in ultrasonic image processing, the second circuit operative to either perform noise adaptive image processing in addition to the filtering of the filter and select a response function as a function of the noise parameter.

8. The invention of claim 7 wherein the filter comprises a low-frequency stopband.

9. The invention of claim 7 wherein the first circuit generates the noise parameter as a function of a ratio of variance of the image set and the filtered image set.

10. The invention of claim 7 wherein the filter is selected from the group consisting of: an azimuthal filter, a range filter, an elevational filter, a temporal filter, and combinations thereof.

11. The invention of claim 7 wherein the second circuit comprises:
    a third circuit operative to generate a background noise image as a function of an original image and the noise parameter; and
    a fourth circuit operative to use the background noise image in ultrasonic image processing.

12. The invention of claim 11 wherein the third circuit comprises a low-pass filter operative to smooth the background noise image.

13. The invention of claim 11 wherein the fourth circuit is operative to subtract the background noise image from the original image to obtain a noise-reduced image.

* * * * *